Oct. 6, 1931.    D. J. STEWART    1,826,100
HEATING SYSTEM AND CONTROL THEREFOR
Filed Jan. 13, 1930    3 Sheets-Sheet 1
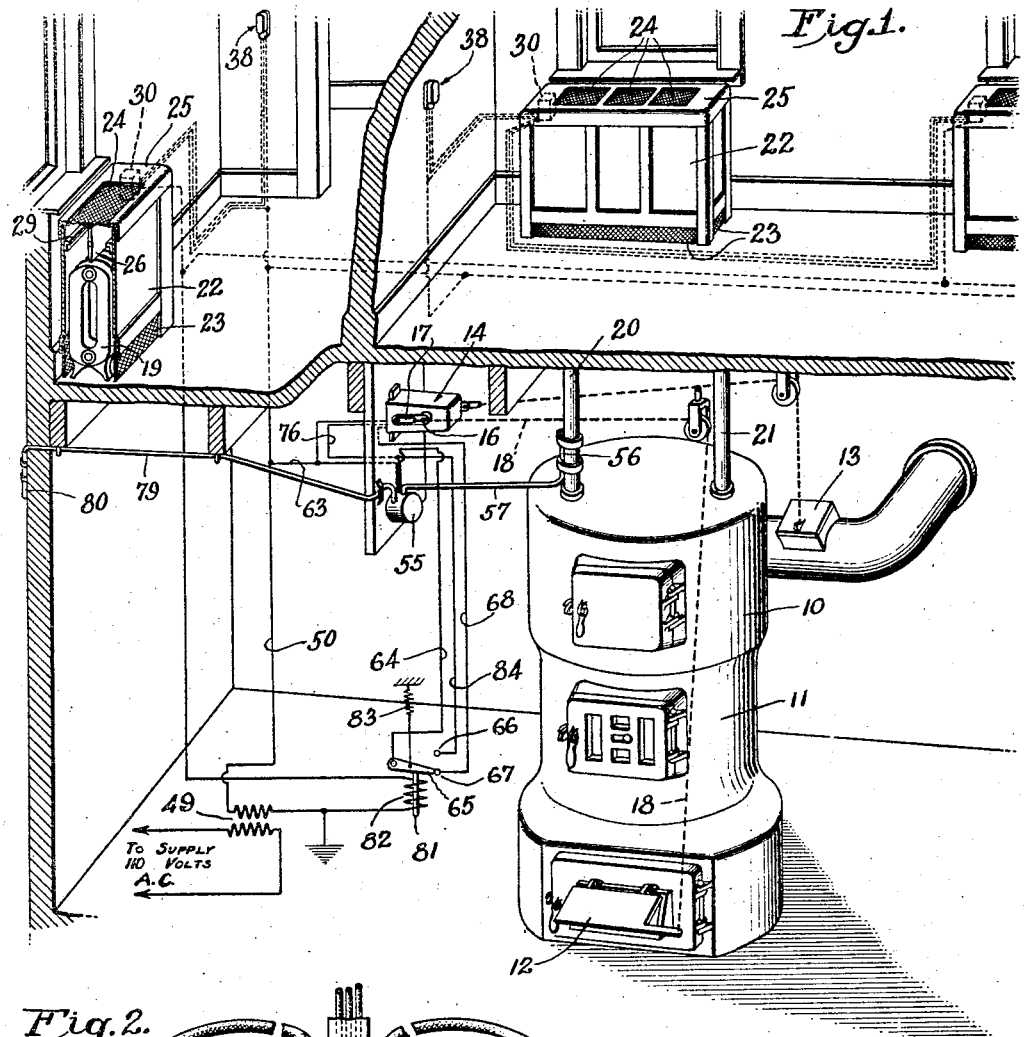
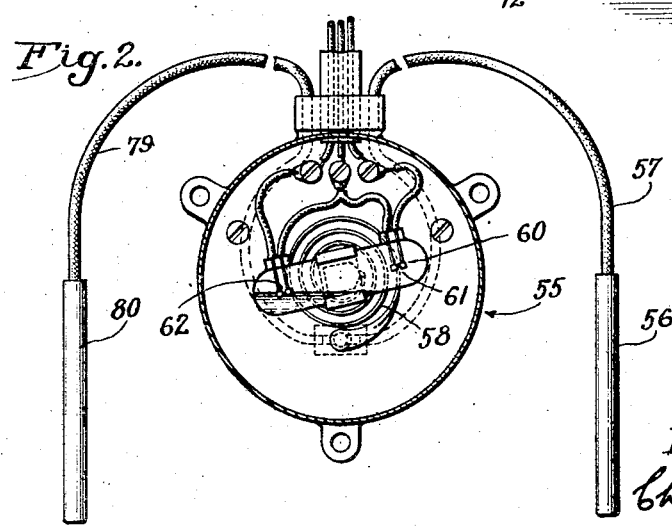
INVENTOR
Duncan J. Stewart.
BY
ATTORNEYS Oct. 6, 1931. D. J. STEWART 1,826,100
HEATING SYSTEM AND CONTROL THEREFOR
Filed Jan. 13, 1930  3 Sheets-Sheet 2
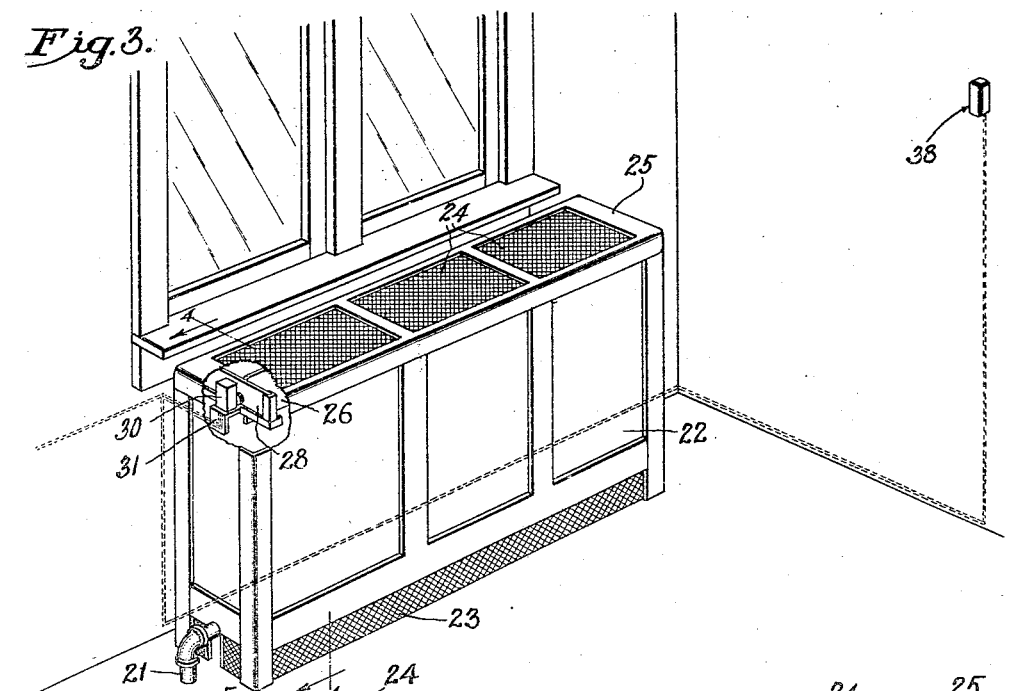
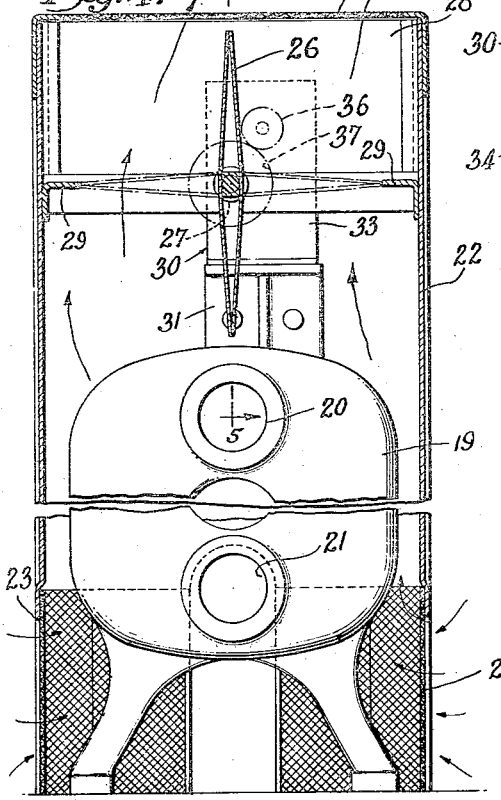
INVENTOR
Duncan J. Stewart.
BY
ATTORNEYS Oct. 6, 1931.          D. J. STEWART          1,826,100
HEATING SYSTEM AND CONTROL THEREFOR
Filed Jan. 13, 1930          3 Sheets-Sheet 3
Fig. 6.
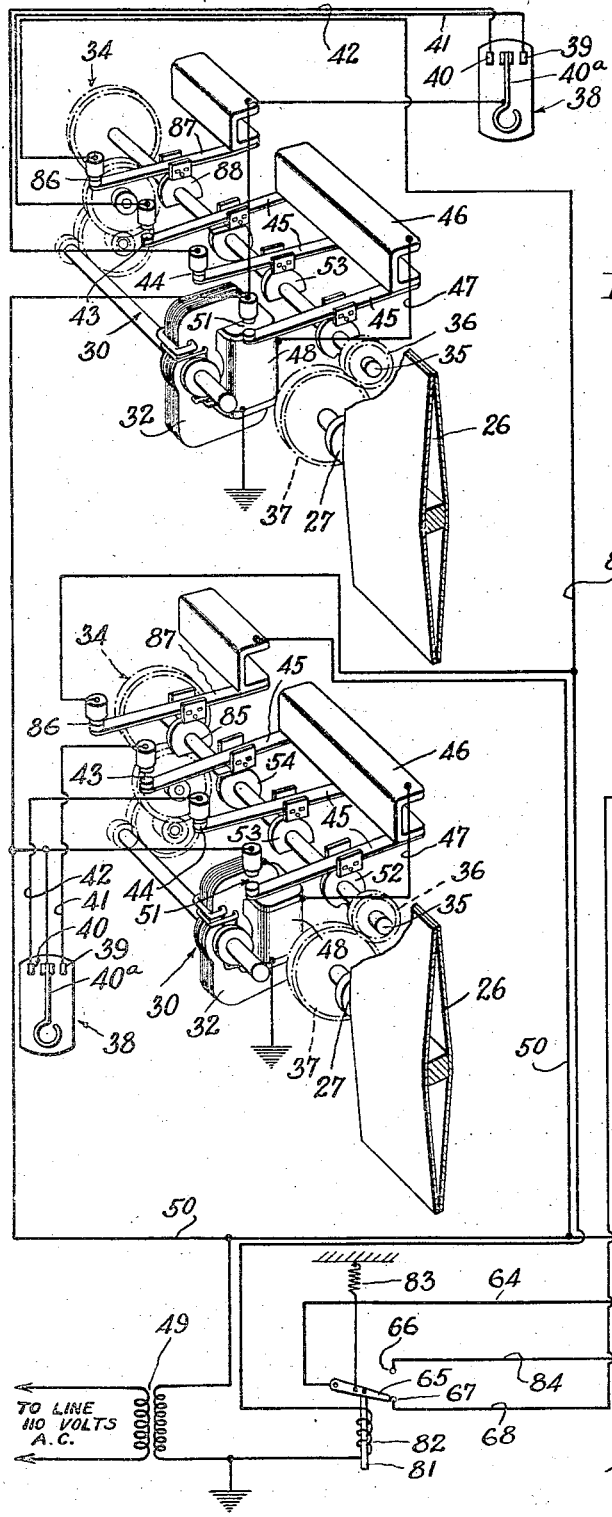
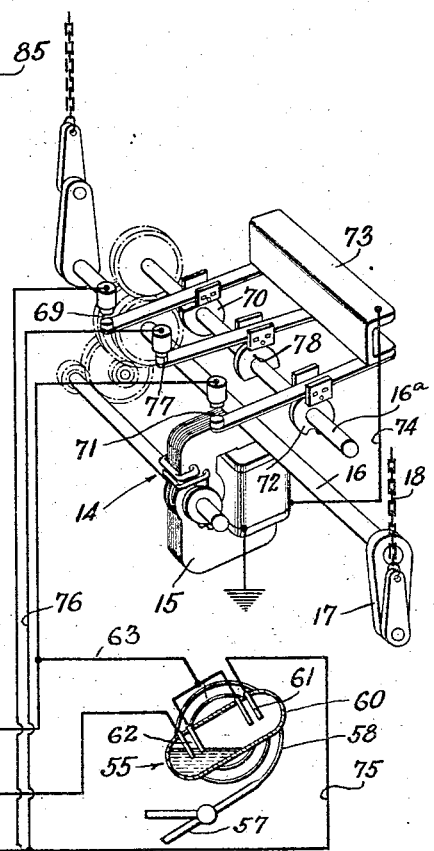
INVENTOR
Duncan J. Stewart.
BY
ATTORNEYS Patented Oct. 6, 1931

1,826,100

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

HEATING SYSTEM AND CONTROL THEREFOR

Application filed January 13, 1930. Serial No. 420,325.

This invention relates to heating systems for buildings and more particularly to the thermostatic control of such systems for the purpose of regulating accurately and automatically the temperatures maintained in different parts of the building.

In prior systems of the above general character, there is a relatively large temperature overrun which occurs in the different rooms between the time when the room thermostat ceases to call for heat and the time when the heat supply to the air in the room is actually cut off. Also, there is a considerable temperature lag due to the inability of the heating unit for a given room to respond and deliver heat to the room immediately when the thermostat calls for heat. The resulting variance of the temperature over such a wide range is particularly noticeable in localities subject to sudden and widely varying temperature changes.

In order to reduce this overrun and lag to a minimum and at the same time substantially equalize the two, it is necessary first to supply heat at points well distributed throughout the building. Secondly, the flow of heat into different rooms should be so regulated that the delivery of heat to any room will be interrupted or resumed immediately when the controlling thermostat detects a rise or fall in the temperature. Thirdly, heating of the air in the room should take place as slowly as is consistent with the temperature outside of the building; that is to say, the temperature of the medium supplying heat to the rooms should be varied to correspond to changes in the weather conditions. Finally, the temperature of the heat supplying medium for any given outside temperature should be closely regulated.

The primary object of the present invention is to provide a new and improved thermostatic control for heating systems which is capable of satisfying, in so far as is practical, the ideal conditions above set forth. In carrying out this object, air is employed as a medium for carrying heat from a source of supply to the individual rooms so that the flow may be interrupted or resumed substantially instantaneously under automatic thermostatic control and the temperature of this heated air supply is maintained constant for any given condition of the weather but varied from time to time so that the temperature of the heated air supply is inversely proportional to the temperature outside of the building.

A more specific object is to provide a control system of the above character in which hot water is employed as a medium for conveying heat from a primary source of supply to the air which is to be heated before delivery to a room, and the water temperature is varied automatically in response to temperature changes outside of the building.

Still another object is to effect a further economy in fuel consumption in the above system by making the system fully automatic through the provision of means for rendering a thermostat for controlling the primary source of heat ineffective to initiate or increase the supply of heat to the system, except when one or more of the individual room thermostats is calling for heat.

Other objects and advantages of the invention become apparent from the following detailed description taken in connection with the accompanying drawings, in which Figure 1 is a fragmentary sectional view of several rooms of a building equipped with a heating system embodying the features of the present invention.

Fig. 2 shows a thermostat for controlling the primary source of heat.

Fig. 3 is a perspective view of a unit for supplying heat to one room of the building.

Fig. 4 is a fragmentary sectional view taken along the line 4—4 of Fig. 3.

Fig. 5 is a sectional view taken along the line 5—5 of Fig. 4.

Fig. 6 is a schematic view and wiring diagram showing the various control devices employed in the present system.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawings the invention is embodied in a heating system in which heat from a primary source of supply is transferred to a heating fluid which is conveyed through a system of piping to a plurality of heat-storing devices, one or more of which may be located in each room of the building, thereby providing a unitary heating means for such room. In view of the accuracy with which the temperature of hot water may be maintained under thermostatic control, it is preferred to employ this type of heating fluid in the circulating system.

Herein the body of water is heated in a boiler 10 by a heater 11 constituting a primary source of heat. This exemplary heater is adapted to burn solid fuel and therefore its operation is regulated by varying the positions of a draft door 12 and a check damper 13. This may be accomplished through the medium of a power operator 14 of well known construction which includes an electric motor 15 (Fig. 6) geared to a shaft 16 having a crank 17 connected to the draft door 12 by a cable 18 and adapted in alternate half-revolutions of the shaft to open or close the door. A similar crank actuator is provided for the check damper 13.

In the present instance, the heat-storing device in each room includes a radiator 19 whose inlets and outlets are connected respectively to the hot water supply and return pipes 20 and 21. Surrounding the radiator and confining a quantity of air in intimate contact with the radiator surface is a casing 22 constructed of sheet metal and having its walls suitably lagged to prevent outward radiation of heat. The side and end walls of the casing are cut away near the floor to define an inlet opening 23 communicating with the space in the surrounding room. The outlet from the casing is through apertures 24 in a cover 25 and is controlled by a suitable shutter herein shown in the form of an elongated metal vane 26 located beneath the cover and having end trunnions 27 journaled in bearing supports provided by one end wall of the casing 25 and a partition 28 depending from the cover near the other end of the casing.

It will be apparent that the casing defines an upwardly extending passageway through which air will flow by natural circulation when the radiator is heated and the vane 26 is disposed in vertical position as shown in Fig. 4. When the vane is positioned horizontally, as indicated in dotted outline, it will close the rectangular opening defined by the partition 28, the opposite end wall of the casing, and the opposed edges of two inwardly extending flanges 29. Further circulation of heated air into the surrounding room is thus prevented and the air that is confined within the casing becomes heated to a temperature approximately equal to that of the water supplied to the radiator.

A power operator 30 is associated with each shutter and adapted to open and close the shutter quickly under the control of an individual room thermostat. The operator herein shown is mounted on a bracket 31 on the side of the partition 28 opposite the shutter 26 and comprises generally a small electric motor 32 mounted in a frame 33 and connected by a speed reducing gear 34 to a control shaft 35 which through a pinion 36 drives a gear 37 fast on the projecting end trunnion 27 of the shutter. A two-to-one reduction in movement is effected through the gears 36 and 37. The electrically actuated operator thus provided is capable of turning on or interrupting the flow of heat into a room with great rapidity and is adapted for use with extremely sensitive control thermostats.

The room thermostats, designated by the numerals 38, are of well known construction having two switches 39 and 40 which are closed alternately by movement of a sensitive tongue 40ª in response to rise and fall of the room temperature relative to a value predetermined by the setting of the thermostat. To utilize these switches for initiating successive shutter-operating cycles of the motor 32, their stationary contacts are connected by conductors 41 and 42 to the relatively stationary contacts of two switches 43 and 44 incorporated in the shutter operator and normally tending to close by reason of the resiliency of strips 45 on which their movable contacts are mounted. The latter contacts are made electrically common by a bar 46 connected by a conductor 47 to the winding 48 of the motor 32, the other terminal of which may be grounded to the piping of the hot water system and thus connected to the grounded side of an alternating current source formed by the secondary of a transformer 49. The tongue of each thermostat 38 is connected to a branched conductor 50 which constitutes the main power line leading from the non-grounded side of the transformer secondary.

To relieve the burden on the thermostat switches during the major portion of each cycle of the shutter operator, a switch 51, whose contacts are connected respectively to the power line 50 and to the motor winding through the medium of the conductor 47, is controlled by a cam 52 on the shaft 35, the cam allowing the switch to close shortly after the initiation of each operating cycle and acting to open the switch and terminate such cycle after the control shaft 35 has travelled a half revolution which, it will be observed, moves the shutter through a quarter revolution from open to closed position or vice versa.

The starting switch 44, which cooperates with the thermostat switch 40 to initiate the shutter-closing cycle, is allowed to close by a cam 53 prior to the completion of the shutter-opening cycle of the motor operator and is opened during the shutter-closing cycle after the running circuit through the switch 51 has taken control of the motor. A similar cam 54 controls the starting switch 43 which governs the shutter-opening cycle and allows the switch to close during the shutter-closing cycle to prepare the starting circuit which is closed by the thermostat switch 39.

With the arrangement thus described, it will be apparent that the shutter 26 will be closed quickly and the delivery of heat to the room interrupted substantially instantaneously when the controlling thermostat ceases to call for heat as indicated by closure of the thermostat switch 40. Conversely the supply of heat will be turned on immediately following the closure of the switch 39. This result is attained by employing air as a medium for transferring heat from the radiators 19 to the main body of air in the room and regulating the flow of such air. Heating of the room therefore takes place by actual mixing of the heating medium rather than by radiation thereby enabling the heat supply to the room to be interrupted or resumed. Provided that the system is otherwise properly designed, such quick control of the heat supply reduces to a minimum the temperature overrun in bringing the room up to the proper temperature and the time lag required for the heat to reach all parts of the room.

In order to maintain the temperature of the heated air delivered to the different rooms as near constant as is practical, means is provided for regulating the heater 11 in such a manner as to maintain the fluid of the system at a uniform temperature. In the present instance, this means comprises a thermostat 55 responsive to the hot water temperature and arranged to initiate the operating cycles of the draft operator 14. For a purpose which will later appear, the thermo-sensitive element of the thermostat 55 comprises a bulb 56 containing an expansible fluid and disposed in contact with the outlet pipe 20 leading from the boiler so as to respond approximately to the temperature of the water leaving the boiler. Pressure changes within the bulb are communicated through a conduit 57 to the fixed end of a spirally wound Bourdon tube 58.

Supported on the free end of the Bourdon tube is a mercury-containing bulb 60 with a pair of insulated switch terminals at its opposite ends forming switches 61 and 62. When the temperature of the water falls below a point predetermined by the setting of the thermostat, the resulting decrease in pressure in the Bourdon tube causes the mercury bulb to be tilted to the position shown in Fig. 2, thereby closing the switch 62. Conversely a rise in temperature of the water above said predetermined point causes the switch 61 to be closed.

The switches 61 and 62 have electrically common terminals which are connected by a conductor 63 to a branch of the power line 50. The other terminal of the switch 62 is adapted to be connected through a conductor 64, a movable member 65 common to two switches 66 and 67, and a conductor 68 to the stationary contact of an insulated switch 69 associated with the operator 14. The latter switch is closed by a cam 70 on a countershaft 16ª just prior to the termination of the cycle of the operator during which the draft damper 12 is closed. This switch is opened shortly after the initiation of the draft opening cycle and subsequent to the closure of a switch 71 which is controlled by a cam 72 to terminate each operating cycle of the power operator 14. The stationary and movable terminals of the latter switch are connected respectively to the power line 50 and the common bus bar 73 of the draft operator which, through the medium of a conductor 74, is connected to the winding of the motor 15.

The other terminal of the thermostat switch 61 is connected by conductors 75 and 76 to the stationary contact of a switch 77 which is controlled by a cam 78 to initiate the draft-closing cycle of the operator 14. Upon closure of the switch 61 with the parts arranged as shown in Fig. 6, closure of the switch 61 will complete a circuit which may be traced from the transformer secondary through the power line 50, conductor 63, switch 61, conductors 75 and 76, closed switch 77, bus bar 73, conductor 74, winding of the motor 15 to the grounded side of the alternating current source. This starts the motor 15 to close the draft damper 12 and thereby reduce the supply of heat to the water in the boiler. During this cycle the running switch 71 is allowed to close and the switch 77 is opened, the cycle being finally terminated by opening of the switch under the control of the cam 72. In a similar way the operating cycle to open the draft damper 12 is initiated when the switch 62 is closed which establishes a circuit from the power line 50 through conductor 63, switch 62, conductor 64, closed switch 67, conductor 68, closed switch 69, the motor winding to the grounded power line. Such opening of the draft damper enlivens the fire and causes more heat to be supplied to the body of water in the boiler until its temperature has reached a predetermined point.

In order that the air in the rooms will be heated by the individual heating units above described at the same rate in mild weather as in severe weather, the temperature of the heated air supply should vary inversely proportional to the outside temperature. This is accomplished by varying the temperature of the hot water by changing the setting of the thermostat 55 to correspond to the temperature existing outside of the building. In the present instance, such adjustment of the thermostat is effected automatically and for this purpose the Bourdon tube 58 communicates through a conduit 79 with a bulb 80 constructed similar to the thermo-sensitive bulb 56 and located outside of the building. It will be seen that the expansion of the Bourdon tube is governed by the joint action of the two thermal elements 56 and 80 which have a like effect upon the Bourdon tube in determining the angle at which the mercury bulb is tilted. That is to say, a rise in the temperature to which either thermal element is exposed increases the pressure within the Bourdon tube 58 which tends to tilt the mercury bulb in a direction to close the switch 61. An increase in the outside temperature will therefore cause the switch 61 to be closed by the thermal element 56 at a lower temperature with the result that the water temperature will be maintained at a correspondingly lower point. On the other hand, a decrease in the outside temperature will cause a like increase in the water temperature.

Such regulation of the primary heat source to compensate for outside temperature changes makes practical the particular kind of room heating units employed in the present system thereby rendering the system as a whole highly effective in maintaining close regulation of the room temperatures. As above set forth, the room heating units employ air as a heat carrier in order to render the heat supply available instantly in response to the thermostat's call. When the shutter is opened, circulation through the radiator casing starts instantly and continues at a rate in proportion to the radiator temperature. A large volume of heated air is quickly delivered to the room, the temperature of the air and therefore the quantity of heat carried thereby being proportional to the radiator temperature. It follows therefore that if outside temperature is high as in mild weather and the water temperature is nevertheless maintained high enough to heat the room at the desired rate on a cold day, the room would become considerably overheated due to the sudden in-rush of such a large amount of heat before such overheating can be detected by the room thermostat. Furthermore, the bulk of such highly heated air would tend to accumulate in the strata near the ceiling of the room resulting in a further delay of the thermostat in detecting the overheating. Under these conditions, the advantages attained by employing such quick responding room heating units would be nullified.

This inherent tendency for the room heating units to cause overheating is obviated in the present instance by controlling the primary heat source to maintain the temperature of the confined air inversely proportional to the outside temperature. Thus, on a mild day when only a small quantity of heat is required to raise the room temperature through the normal range, a relatively lower temperature difference is maintained between the hot water temperature and that to which the room thermostat is set to respond. The result of such outside control, is to maintain a uniform rate of heating under all conditions, at the same time taking advantage of the particularly desirable characteristics of the room heating units herein employed.

In order to avoid supplying heat needlessly to the hot water in the system, means is provided for rendering the switch 62 of the thermostat 55 ineffective when none of the room thermostats is calling for heat. Herein this means includes the switch 67 whose movable contact 65 is connected to the armature 81 of a magnet 82 so that the switch will be closed whenever the magnet is energized. A spring 83 acts to open the switch 67 and close the switch 66 whenever the magnet is deenergized. The latter switch is interposed between the conductor 64 and a conductor 84 leading to the conductor 76 and therefore is in parallel with the switch 61 of the thermostat 55. From this it follows that whenever the magnet 82 is deenergized to open the switch 67, closure of the switch 66 will initiate a cycle of the operator 14 to close the draft door 12 and thereby reduce supply of heat to the water in the system even though the thermostat 55 indicates that the temperature of the water is below the proper value. Since the switch 67 is interposed in series with the operator switch 69 and the thermostat switch 62, the thermostat 55 will be ineffective to initiate a draft-opening cycle so long as the magnet 82 remains deenergized.

Energization of the magnet 82 is controlled by a plurality of parallel circuits each common to a branch of the power line 50 and having a common return conductor 85 leading to one terminal of the magnet winding 82, the other terminal of this winding being connected to the grounded power line. Each of the control circuits above mentioned includes switch 86 whose stationary contact is connected to conductor 85. The movable contact of this switch is carried on an arm 87 connected to the power line 50. A cam 88 on the shaft 35 of the shutter operator acts on the arm 87 to allow the switch 86 to close when the shutter 26 is in open position and allow the switch to open when the shutter is closed. Since the position of rest of the shaft 35 always corresponds to the condition of the room thermostat 38 controlling the shutter operator by which the switch 86 is actuated, it will be apparent that a circuit through the magnet 82 will remain closed and the thermostat 55 thereby rendered operative so long as anyone of the room thermostats 38 calls for heat. However, when all of the thermostats cease to call for heat, all of the parallel energizing circuits through the magnet will be interrupted and the magnet deenergized with the result that the thermostat 55 will be unable to open the draft damper 12 even though the water temperature falls below that at which the thermostat 55 is set to respond. If, at the time of such deenergization, the furnace draft is open, closure of the switch 66 will complete the starting circuit through the switch 77 of the draft operator 14 thereby starting the latter to execute a cycle during which the draft door 12 is closed thereby discontinuing the supply of heat to the water in the system.

The auxiliary control of the primary heat source effected through the use of switches 66 and 67 which respond to the condition of all of the room thermostats is particularly advantageous where the furnace is heated by an oil burner or the like which can be started and stopped under automatic control. In such a case the system operates entirely automatically throughout the year and without any attention whatever.

I claim as my invention:

1. A heating system for a building combining means providing a chamber for confining a body of air, said chamber having an outlet for discharging air into a room to be heated, a thermostat in said room controlling the automatic opening and closing of said outlet to admit or interrupt the flow of heated air into the room, means for maintaining a predetermined temperature of the air in said chamber for a given temperature outside of the building and a lower temperature of the air when the outside air rises above said given temperature, said last mentioned means comprising a heater, means containing a body of fluid for transferring heat from said heater to the air in said chamber, two thermo-sensitive elements, one responsive to the temperature of said fluid, the other being responsive to the temperature outside of the building, and a control-device governed by the joint action of said thermo-sensitive elements and regulating the operation of said heater.

2. A heating system for a building, combining means providing a chamber confining a body of air and having an outlet leading to a room to be heated, a heater for supplying heat to the air confined within said chamber, a shutter controlling the flow of heated air from said outlet, an operator for said shutter driven by an electric motor and adapted in successive operating cycles to quickly open and close said shutter and thereby permit or interrupt the flow of heated air into said room, a thermostat responsive to the temperature within said room and operable to initiate alternate opening and closing cycles of said shutter operator, a thermostat controlling said heater to maintain a substantially uniform temperature of the air in said chamber, and adjusting means by which the setting of said last mentioned thermostat may be varied in accordance with the temperature outside of said building whereby to decrease the temperature at which the air in said chamber is maintained when the outside temperature increases and to increase the temperature within said chamber when the outside temperature decreases.

3. A heating system for a building combining individual room heating means, a plurality of thermostats responsive to temperature changes in the different rooms and each arranged to govern the operation of one of said room heating means, a heater for delivering heated fluid to all of said room heating means, a thermostat controlling said heater to maintain the supply of fluid to said room heating means at uniform temperature, a means operating automatically to render said last mentioned thermostat ineffectual in controlling said heater when all of said room thermostats cease to call for heat and to render the same again operative when any one of the room thermostats calls for heat.

4. A heating system for a building combining individual room heating means, a plurality of thermostats responsive to temperature changes in the different rooms and each arranged to govern the operation of one of said room heating means, a heater for delivering heated fluid to all of said room heating means, a thermostat controlling said heater to maintain the supply of fluid to said room heating means at uniform temperature, an electromagnet adapted when energized and deenergized to render said last mentioned thermostat effectual and ineffectual in controlling said heater, a single circuit through said electromagnet controlling the energization thereof so as to render the heater control thermostat ineffectual when all of said room thermostats cease to call for heat and effectual when any one thermostat calls for heat.

In testimony whereof, I have hereunto affixed my signature.

DUNCAN J. STEWART.